(12) United States Patent
Kautz et al.

(10) Patent No.: US 10,272,837 B2
(45) Date of Patent: Apr. 30, 2019

(54) LIGHTING SYSTEM FOR A VEHICLE DOOR

(71) Applicants: AUDI AG, Ingolstadt (DE); BETA Beratungs-und Beteiligungs-GmbH, Linz (AT)

(72) Inventors: Oliver Kautz, Bad Friedrichshall (DE); Roland Pirsic, St. Florian (AT)

(73) Assignees: AUDI AG, Ingolstadt (DE); BETA Beratungs—und Beteiligungs-GmbH, Linz (AT)

( * ) Notice: Subject to any disclaimer, the term of this patent is extended or adjusted under 35 U.S.C. 154(b) by 0 days.

(21) Appl. No.: 15/563,836

(22) PCT Filed: Mar. 12, 2016

(86) PCT No.: PCT/EP2016/000448
§ 371 (c)(1),
(2) Date: Oct. 2, 2017

(87) PCT Pub. No.: WO2016/155868
PCT Pub. Date: Oct. 6, 2016

(65) Prior Publication Data
US 2018/0093609 A1   Apr. 5, 2018

(30) Foreign Application Priority Data

Apr. 2, 2015   (DE) .......................... 10 2015 004 411

(51) Int. Cl.
*B60Q 3/54* (2017.01)
*B60Q 3/64* (2017.01)
(Continued)

(52) U.S. Cl.
CPC .............. *B60Q 3/78* (2017.02); *B60Q 3/217* (2017.02); *B60Q 3/54* (2017.02); *B60Q 3/64* (2017.02); *B60Q 2500/10* (2013.01)

(58) Field of Classification Search
CPC .. B60Q 3/0279; B60Q 3/0203; B60Q 3/0293; B60Q 3/001; B60Q 1/323; B60Q 1/2669;
(Continued)

(56) References Cited

U.S. PATENT DOCUMENTS 8,876,352 B2 * 11/2014 Robbins .................... F21K 9/00
                                                        362/612
9,016,913 B2 *  4/2015 Englert .................. B60Q 1/323
                                                        362/23.05
(Continued)

FOREIGN PATENT DOCUMENTS

DE        10123263 A1    11/2002
DE        69722186 T2     2/2004
(Continued)

OTHER PUBLICATIONS

Notification of Transmittal of Translation of the International Preliminary Report on Patentability dated Oct. 12, 2017, in connection with corresponding international application No. PCT/EP2016/000448 (8 pages).
(Continued)

*Primary Examiner* — William N Harris
(74) *Attorney, Agent, or Firm* — Maier & Maier, PLLC (57) ABSTRACT

A lighting system for an interior module of a motor vehicle of a motor vehicle provided with an illumination source, at least one optical waveguide and at least one radiating element. The at least one optical waveguide is arranged at a main frame of the interior module and the light generated by at least one illumination source is provided to a radiating element which is optically connected to the optical waveguide.

6 Claims, 5 Drawing Sheets

(51) Int. Cl.
*B60Q 3/78* (2017.01)
*B60Q 3/217* (2017.01)

(58) Field of Classification Search
CPC .. B60Q 3/217; B60Q 3/62; B60Q 3/64; E05B 17/10
USPC .............................. 362/488, 490 M, 501, 490
See application file for complete search history.

(56) References Cited

U.S. PATENT DOCUMENTS

| | | | | |
|---|---|---|---|---|
| 9,016,914 | B2* | 4/2015 | Ukai | B60Q 3/51 362/488 |
| 2005/0219855 | A1* | 10/2005 | Iwai | B60Q 1/26 362/490 |
| 2010/0118664 | A1* | 5/2010 | Nishida | G11B 5/314 369/13.33 |
| 2010/0214795 | A1 | 8/2010 | Salter et al. | |
| 2011/0228553 | A1* | 9/2011 | Igoe | B60R 13/0243 362/558 |
| 2012/0327673 | A1 | 12/2012 | Ureta Hortigueela et al. | |
| 2013/0155709 | A1* | 6/2013 | Kim | B60Q 3/30 362/496 |
| 2017/0210275 | A1* | 7/2017 | Kubo | B60R 13/02 |
| 2017/0217366 | A1* | 8/2017 | Kraemer | B60Q 3/54 |

FOREIGN PATENT DOCUMENTS

| | | |
|---|---|---|
| DE | 10240270 A1 | 3/2004 |
| DE | 10259623 A1 | 7/2004 |
| DE | 10341409 A1 | 4/2005 |
| DE | 102006023593 A1 | 11/2007 |
| DE | 102008041701 A1 | 3/2010 |
| DE | 112008002935 T5 | 9/2010 |
| DE | 102010023247 A1 | 12/2011 |
| DE | 202014000342 U1 | 4/2014 |
| DE | 102013100941 A1 | 7/2014 |
| DE | 102013007938 A1 | 11/2014 |
| FR | 2912095 A1 | 8/2008 |
| FR | 2991936 A1 | 12/2013 |
| WO | 2006015588 A1 | 2/2006 |
| WO | 2009058723 A2 | 5/2009 |
| WO | 2009140025 A2 | 11/2009 |

OTHER PUBLICATIONS

Examination Report dated Jan. 18, 2016 of corresponding German application No. 10 2015 004 411.7; 7 pgs.
International Search Report dated Jun. 7, 2016 of corresponding International application No. PCT/EP2016/000448; 15 pgs.
German Office Action dated Sep. 14, 2018, in connection with corresponding DE Application No. 10 2015 004 411.7 (10 pgs., including machine-generated English translation).

* cited by examiner

LIGHTING SYSTEM FOR A VEHICLE DOOR

FIELD

The present invention relates to a lighting system for an interior module of a motor vehicle as well as to a method for manufacturing a lighting system.

BACKGROUND

It is difficult to provide lighting for the interior of a motor vehicle during its operation, which is to say to illuminate it during the operation of the vehicle, because illumination sources that are visible through the window of the motor vehicle can dazzle and/or irritate, and illumination sources that are arranged in the foot area emit light upward only to an insufficient extent for example to make it possible for a passenger to read a map.

Devices for distributing light from an illumination source are described in prior art.

German Patent Application DE 10 2006 023 593 A1 discloses a light-conducting element for use in components built into motor vehicles. The light guiding element comprises a light-coupling surface and a light-decoupling surface and it is formed at least in one part from an elastic material.

In the German Patent Application 10 2013 007 938 A1 is disclosed an optical waveguide, which is made from a light conducting material and which is provided on one surface with a decoupling structure, wherein the decoupling structure decouples light that is coupled in the longitudinal direction of the light guide at an angle to the decoupling structure in the vicinity of the light guide.

A cladding element for an interior space of a motor vehicle provided with a a translucent covering layer arranged on the base part of the cladding element is disclosed in the German patent DE 102 40 270 A1.

SUMMARY OF THE DISCLOSURE

Against this background, a lighting system for an interior module of a motor vehicle is proposed, which has at least one illumination source, at least one light optical wave guide and at least one radiating element, wherein the at least one optical waveguide is arranged at a main frame of the interior module and the radiating element, which is connected with the optical waveguide, is provided with light generated by at least one illumination source.

Embodiments of the invention will become evident from the description and from the independent claims.

The lighting system shown here is used in particular for illuminating the interior of a vehicle to which light is provided from a illumination source. The lighting system introduced here can be arranged for example in a vehicle door, a in seat or in a sunroof, which is to say integrated therein.

A radiating element is to be understood in the context of this invention as a material that is suitable for emitting light. In particular, the radiating element according to the invention is constructed with a flat design and it thus enables an advantageous and extensive illumination of an interior of a motor vehicle.

An interior module is to be understood in the context of the present invention as a component of a motor vehicle that can be selected from the following list of components: a door of the vehicle, a seat of the vehicle, cladding and sunroof.

It is conceivable that the radiating element provided according to the invention may consists partially or completely of an optical waveguide, wherein the optical waveguide forming the radiating element can be identical to the optical waveguide according to the invention, or it can be different from the optical waveguide according to the invention.

In the event that the radiating element consists only partially of an optical waveguide, it is conceivable for the optical conductor to be inserted into recesses of a decorative layer which delimits the lighting system according to the invention in the outward direction. In this case, the decorative layer can consist for example of a plastic material, microfibers, a textile, a metal, a natural material such as for example leather, or a mixture of the materials mentioned above.

In particular, the present lighting system relates to an interior module for a motor vehicle having a main frame consisting for example of a plastic material and/or a metal or a composite material into which is introduced at least one illumination source, such as for example an LED. At the main frame is arranged an optical waveguide, which is to say laminated or overlaid, which is optically connected to at least one illumination source. This means that the light that is emitted from at least one illumination source flows through the optical waveguide. A radiating element is again arranged in an advantageous manner on the optical waveguide, which is pasted or pressed therein or connected by means of another technically suitable method for arranging a radiating element on the optical waveguide. It is in particular provided that the radiating element is formed by the optical waveguide itself, so that the optical waveguide and the radiating element consist of one piece and in particular of one material.

In order to produce an esthetically pleasing optical or haptic impression, a decorative layer is also provided which is arranged on the radiating element. The construction of an optical waveguide layer described above, which is provided with a layer containing a radiating element and a decorative layer, can be provided quickly and efficiently for a plurality of interior modules in an industrial manufacturing process.

Since the optical waveguides and the radiating element influence in particular the light guiding characteristics of said lighting element, a respective decorative layer can be designed independently of the lighting aspects, so that the decorative layer is preferably perforated, wherein holes can be provided to enable efficient guiding of the light from the optical waveguide. It is also conceivable that the decorative layer is designed to be translucent.

Since the radiating element influences to a large extent the characteristics of the light emitted from the mentioned lighting system, different forms or material structures of the radiating element are conceivable. In order to generate for example diffused light, a respective radiating element can be designed as a diffuser which is for example colored. The radiating element can consist at least partially of polyurethane foam. With the application of the diffuser material on the rear side to a radiating material, the diffuser material can penetrate for example into the perforations of the radiating element and thus appropriately determine some of the lighting characteristics of the radiating element. Furthermore, the diffuser material prevents contamination of the radiating element, for example by forming a closed surface on the radiating element, in particular with the perforations of the radiating element.

In a possible embodiment of the optical waveguide described in the invention, it is provided that the optical waveguide and/or the radiating element are at least partially made of silicon.

By using silicon for the manufacturing of the optical waveguide or of the radiating element, the optical waveguide or the radiating element essentially remains flexible and it can absorb or provide a buffer against deformations or vibrations of a respective vehicle door, or of the main frame of the vehicle door in a particularly flexible manner during a ride.

In another possible embodiment of the lighting system, it is provided that the optical waveguide is designed as a radiating element and forms with the decorative layer, which is provided with openings, a smooth, a form-fitting surface.

Since when decorative layers that are manufactured for example from textile materials are used, the textiles comprise openings for transmission of light emitted by the radiating element so that dirt can accumulate during the use of a corresponding vehicle, it is provided that the radiating element is form-fittingly engaged in the respective decoration and forms together with the decoration a smooth surface. In order to produce the engagement of the radiating element in the openings of the decoration, the radiating element can be applied for example in liquid form and connected to the decoration.

In another possible embodiment of the present lighting system, an optical waveguide is provided wherein the optical waveguide comprises light-conducting fibers. In order to achieve a selective distribution of the light within the optical waveguide, the optical waveguide may comprise light-conducting fibers, such as for example glass fibers that are incorporated into the filling material of the optical waveguide, such as for example a plastic material or silicon. The light-conducting fibers absorb light supplied from a illumination source and guide the light through the optical waveguide to a radiating element. It is preferred when the respective parts of the light-conductive fibers, such as for example the end parts, are designed as a radiating element.

Light-conducting fibers are advantageously suitable in particular for distribution of light because the fibers can be guided both through narrow points, such as for example seams, as well as used for illumination of a large surface. In particular it is provided that an illumination source or the light-conducting fibers is or are imbedded in a piping or a string component of a decorative element, which for example delimits the vehicle door in the direction toward the interior.

In another possible embodiment of the present lighting system it is provided that the at least one illumination source is at least partially inserted into a seam of a substance delimiting the vehicle door in the direction outward from the interior.

In order to create a space-saving and esthetically pleasing illumination source arrangement on a vehicle door, a seam line consisting for example of a double cap seam is used, into which is sewn for example a holder for holding the illumination source. This means that a holder, which is for example provided on a main frame of a vehicle door, is interposed in the seam line in order to fix or accommodate the illumination source therein.

Furthermore, it is provided in an embodiment that the radiating element provided according to the invention is arranged in a planar position on a main frame of a vehicle door, and it is extended in its dimensions along a region situated around the control panel of the motor vehicle. The optical waveguide provided according to the invention can be designed with dimensions that correspond to the radiating element, so that the optical waveguide and the radiating element are applied or laminated as two layers of a fabric onto the vehicle door.

In another possible embodiment of the present lighting system it is provided that the optical waveguide consists of silicon and comprises at least one illumination source, at least one reflector and at least one diffuser.

Further, the present invention includes a method for manufacturing a lighting system for an interior module of a motor vehicle, in which at least one optical waveguide is connected to a main frame of the interior module, wherein the optical waveguide is further coupled to a radiating element in such a way that the light guided from the illumination source into the optical waveguide by means of the radiating element is emitted into the environment of the interior module.

The present production or manufacturing method is in particular used for arranging the present illumination system in an interior model. For this purpose it is provided that the optical waveguide provided according to the invention is arranged on a main frame of the interior module, which is to say that it is connected to the main frame and the optical waveguide is in turn coupled to the radiating element according to the invention, so that the optical waveguide guides the light generated by the illumination source provided according to the invention into the radiating element and the radiating element illuminates the environment of the interior module.

In a possible embodiment of the present production method it is provided that at least one optical waveguide is glued onto the main frame of the interior module.

In order to connect the optical waveguide to the main frame of the interior module, any technically suitable method for connecting fabrics can be employed, in particular lamination or gluing.

Under "gluing" is to be understood in the context of the present invention connecting two fabrics by means of a connecting material, wherein the connecting material can be designed for example as a dispersion adhesive, an adhesive consisting of 2 components, a hot melt, a solvent-containing an adhesive or any other material that is technically suitable for connecting two fabrics.

In the case when silicon is selected for the optical waveguide, it is provided that the optical waveguide is laminated onto the respective main frame. As an alternative, it is also conceivable that the optical waveguide is produced from a silicon that can be cured on the main frame with UV curing or by using a curing temperature, in particular so that it is applied in a pasty state and subsequently hardened.

In other possible embodiment of the present production method, it is provided that the optical waveguide is connected in a first step by means of a glue to the main frame of the interior module, so that the glue is activated in a second step.

In order to enable an alignment or a subsequent modification of a position of the optical waveguide on the main frame, an adhesive can be used which is applied in a first step and activated in a second step, so that the fixing of the position of the optical waveguide on the main frame is carried out only by means of the second step, namely when the activation takes place. In order to shield the radiating element against the environment of the interior module and to create an esthetically suitable impression, the radiating element is externally surrounded by a decorative element. The decorative element may be provided with openings, which facilitate the transition of the light that is emitted by the radiating element into the environment of the interior module. Since such openings in the decorative layer can be easily filled with dirt when they are used in a vehicle, it is in particular provided that the radiating element fills the respective openings of the decorative layer. This means that the radiating element, which can be formed for example from the optical waveguide, is partially engaged in a form-fitting manner in the respective decorative layer and together with the decorative layer forms a smooth and closed surface.

Further advantages and embodiments of the invention will become apparent from the description as well as from the attached drawings.

It goes without saying that the features described above and those that are still to be explained can be used not only in the respective indicated combinations, but also in other combinations or alone, without deviating from the scope of the present invention.

BRIEF DESCRIPTION OF THE DRAWING

The invention will be next explained in detail based on an embodiments schematically illustrated in the figure and with reference to the figures.

DETAILED DESCRIPTION OF THE DRAWING

Figure 1:
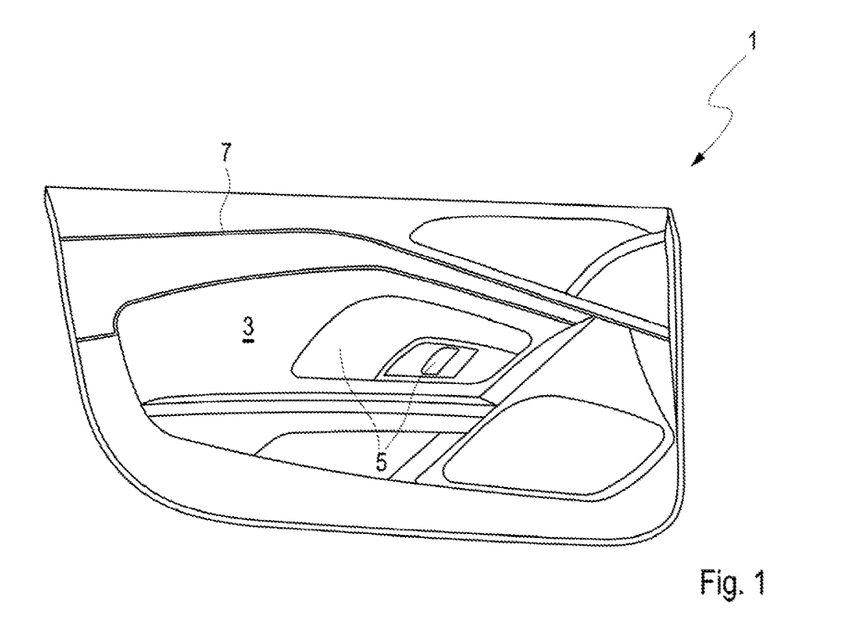
FIG. 1 shows an arrangement in a possible embodiment of the lighting system in a vehicle door.

FIG. 1 shows a vehicle door 1 on which is arranged a lighting system 3. The lighting system 3 surrounds in a planar design a control panel 5 of the vehicle door 1 and illuminates the environment of the motor vehicle 1 uniformly and without creating a glare.

Further, an illumination source is integrated in a seam 7 of a decorative substance of the vehicle doo1, which emits light both directly through the seam 7 into the environment of the vehicle 1, as well as provides light via an optical waveguide for a radiating element.

Figure 2:
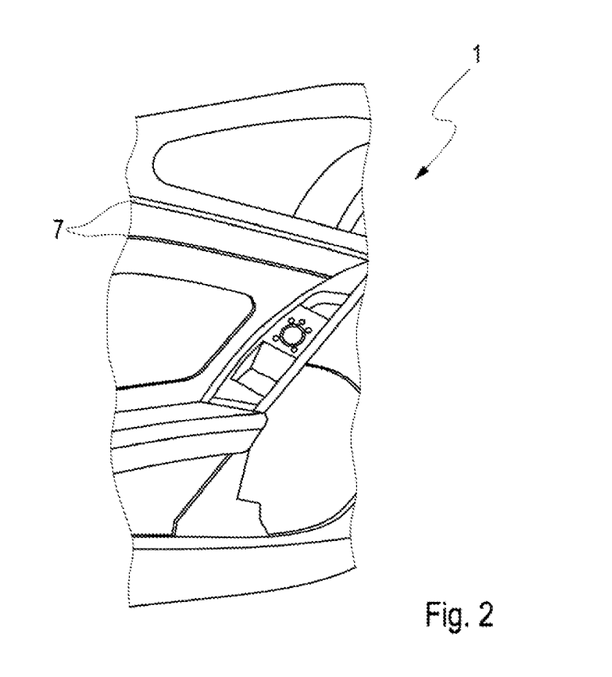
FIG. 2 shows a possible embodiment of the present lighting system with an illumination source integrated in a seam.

FIG. 2 shows a cross-section of the vehicle 1 with a seam 7. The seam 7 is designed as a double cap seam.

Figure 3:
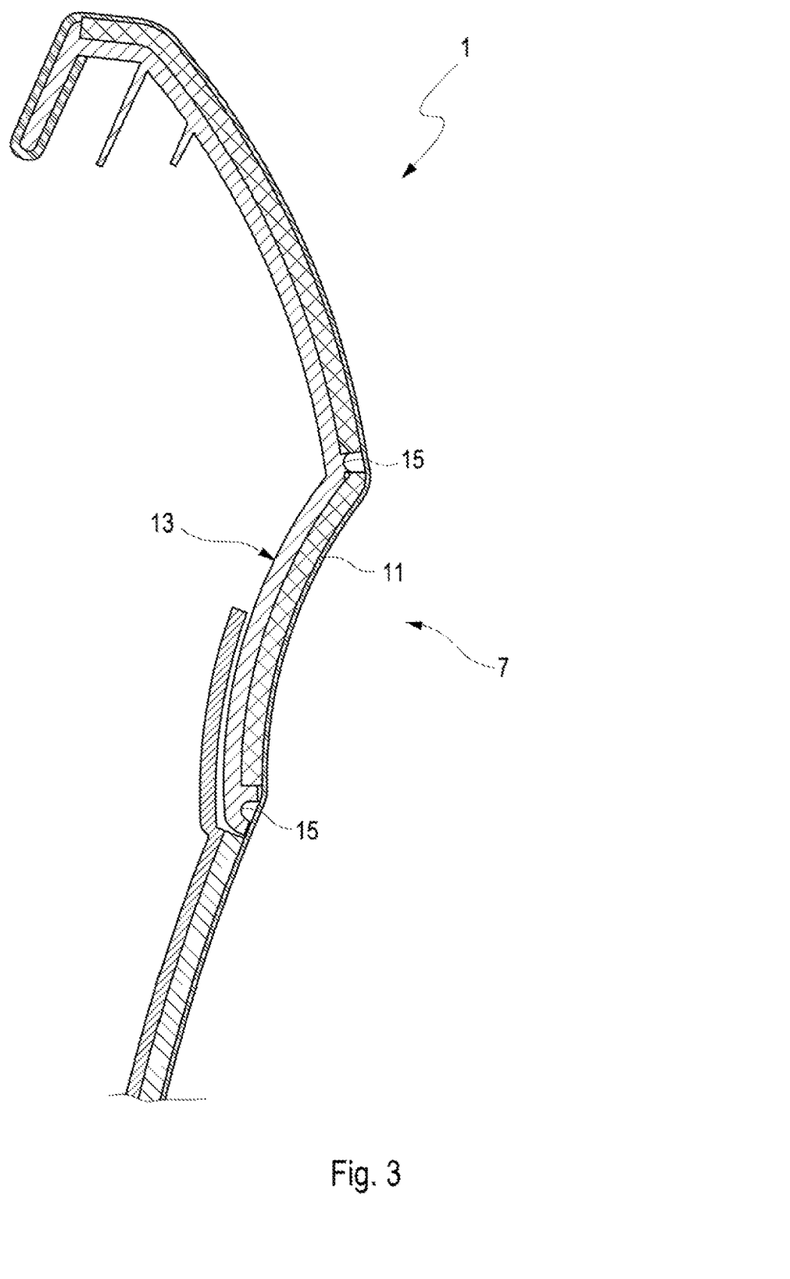
FIG. 3 shows a possible embodiment of the seam of FIG. 2.

FIG. 3 shows the seam 7 in detail. A decorative substance 11 is arranged on a main frame 13 of the vehicle door 1. The decorative substance 11 is interrupted in the region of the seam 7 and thus enables the incorporation of an illumination source, such as for example an LED, in the color of the seam line of the seam 7. In order to receive the illumination source, the main frame 13 is provided with receptacles 15, into which the illumination source can be clamped.

Figure 4:
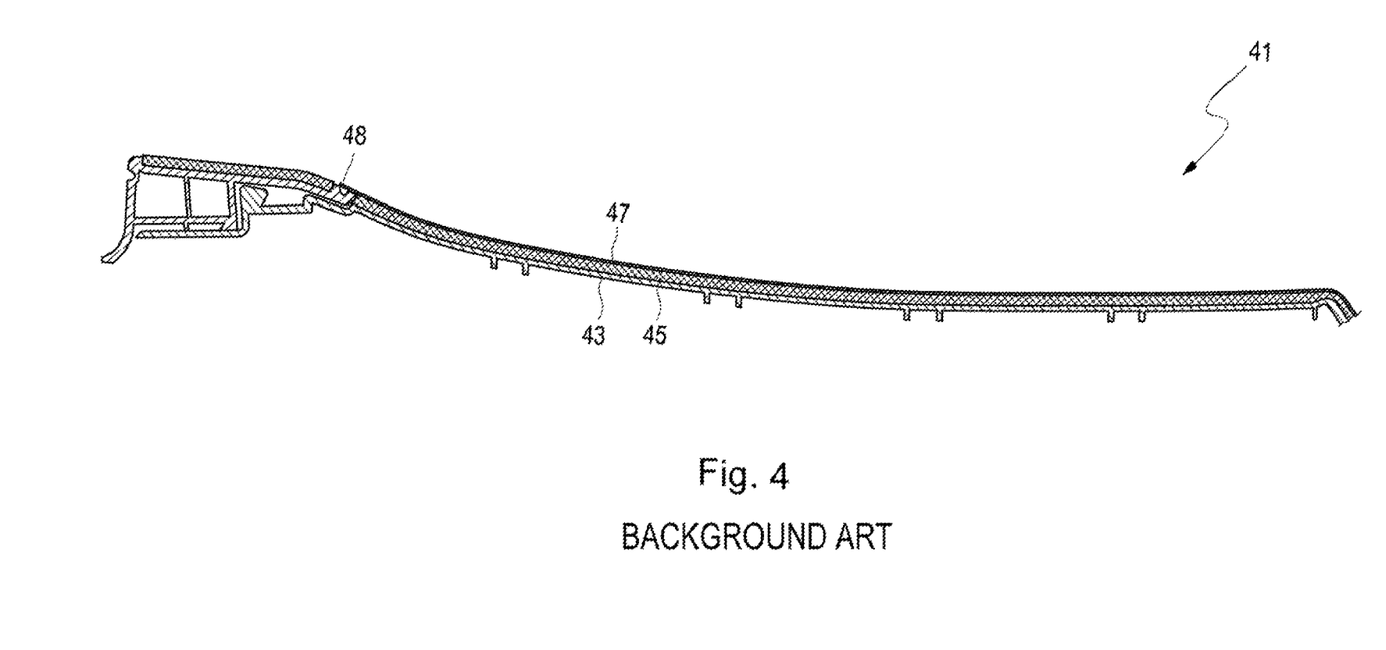
FIG. 4 shows a cross-sectional view of a vehicle door according to prior art.

FIG. 4 shows a cross-section of a vehicle door 41 according to prior art. The vehicle door 41 comprises a main frame 43 from a plastic material, a spacer fabric 45 of polyurethane foam, and a decorative element 47 arranged on the spacer fabric 47. In the case that the vehicle door 41 is equipped with the lighting system 3, the guiding of the light provided with one illumination source could be carried out only in a region 48.

Figure 5:
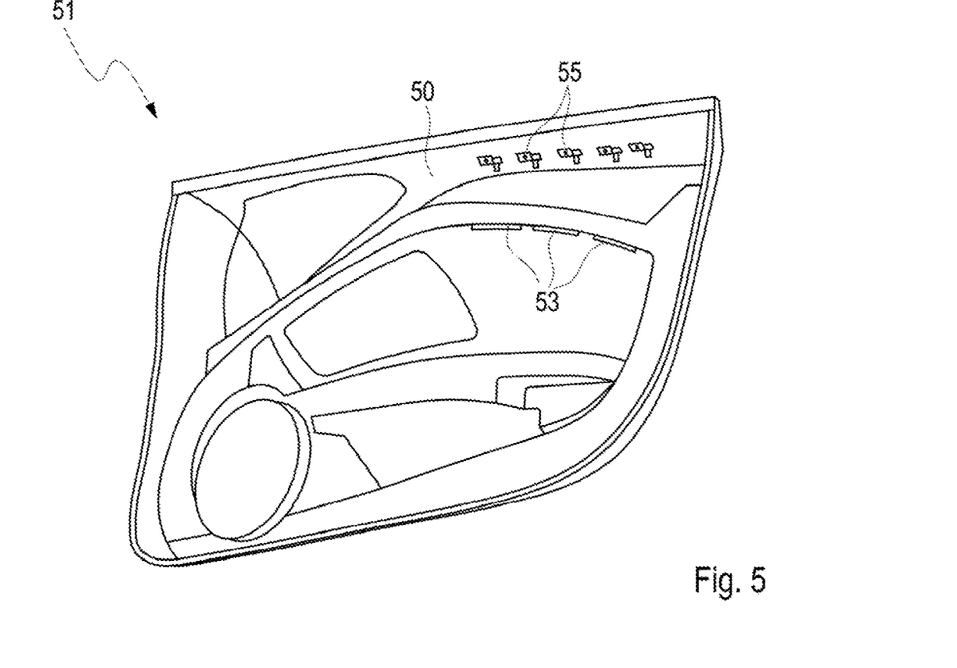
FIG. 5 shows a possible installation positions for illumination sources on a vehicle door according to different embodiments of the present lighting system.

FIG. 5 shows a main frame 50 of a vehicle door 51. In order to arrange the lighting system 3 on the vehicle door 51 and to provide light to it, the illumination sources can be provided in positions 53 and the optical waveguides can be provided in positions 55.

Figure 6:
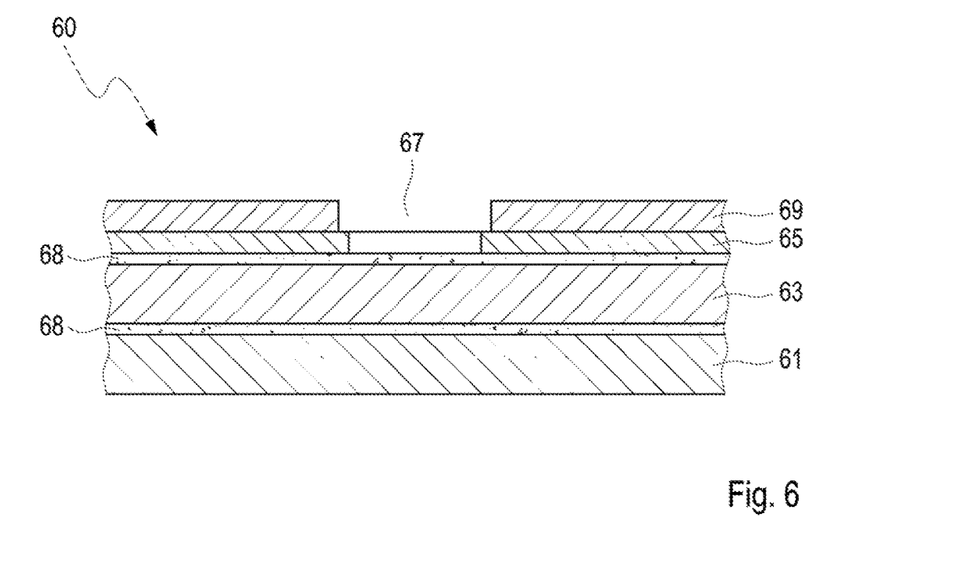
FIG. 6 shows a cross-section through a possible embodiment of the present lighting system.

FIG. 6 shows a cross-section of a lighting system 60 on a main frame 61 of a vehicle door. The vehicle door 60 comprises an optical waveguide 63 which is irradiated with light.

The light of the illumination source is guided by means of the optical waveguide into a radiating element 65, which outputs the light through an opening 67 to the environment of the vehicle door. Adhesive layers 68 are provided in order to arrange the radiating element 65 on the optical waveguide 63 and the optical waveguide 63 on the main frame 61. The radiating element 65 can consist for example of polyurethane foam and it can contain openings that act as a diffuser and that output the light from the optical waveguide 63 directly to the environment of the vehicle door.

Figure 7:
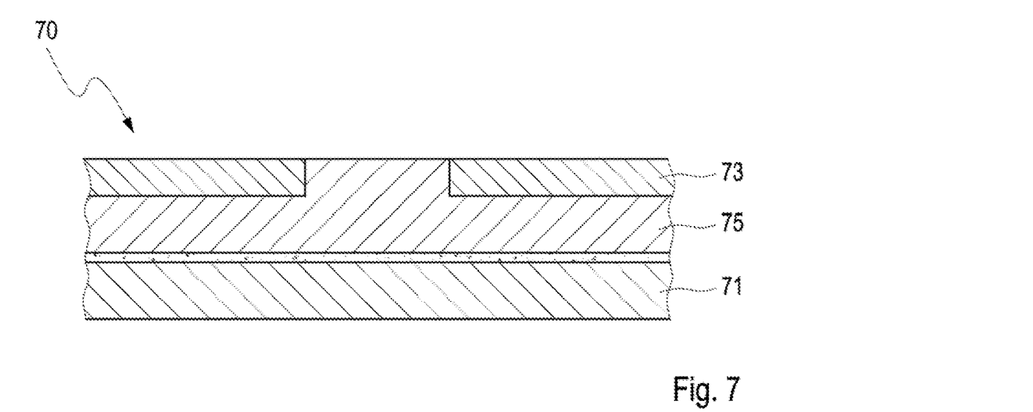
FIG. 7 shows a cross-section through another possible embodiment of the present lighting system.

FIG. 7 shows a cross-section of a lighting system 70 on a main frame 71 of a vehicle door. The lighting system 70 comprises an optical waveguide 75, which is irradiated with the light of an illumination source, not shown here.

The optical waveguide 75 was applied to the main frame 71, which is to say as a raw silicone mass onto an adhesive layer, it was then connected to a decorative substance 73 and subsequently cured with UV radiation.

The light of the illuminations source is guided directly with the optical waveguide into the environment of the vehicle door. This means that the optical waveguide 75 functions both as an optical waveguide and as a radiating element. With the operation in which the optical waveguide is applied as a raw silicon material, the raw silicon material is forced in a form-fitting manner into the openings of the decorative substance 73 and it forms a smooth and thick surface with the decorative substance 73.

Figure 8:
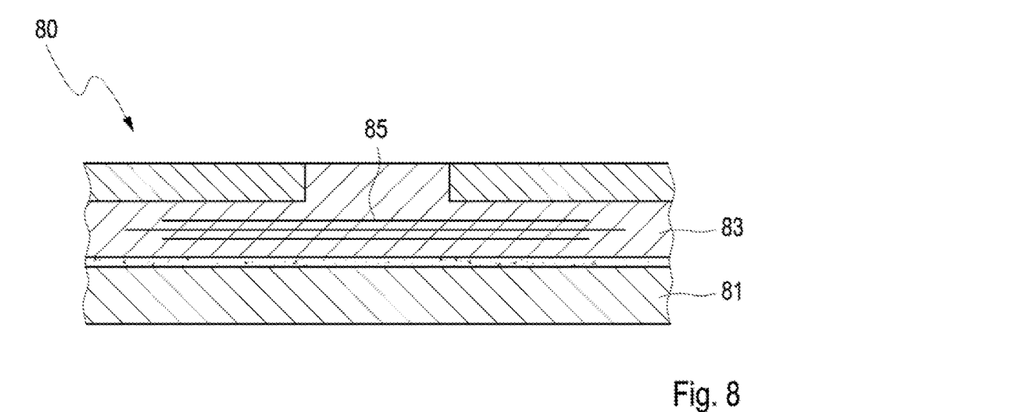
FIG. 8 shows a cross-section through yet another possible embodiment of the lighting system on a vehicle door with light-conducting fibers.

FIG. 8 shows a cross-section of a lighting system 80 on a main frame 81 of a vehicle door. The lighting system 80 comprises an optical waveguide 83, which is irradiated with light by an illumination source, not shown here. The optical waveguide 83 is at the same time also designed as an irradiating element. In the optical waveguide 83 are integrated light-conductive fibers 85, which improve the light-conductive characteristics of the optical waveguide 83. This means that the light conducted by the optical waveguide through the light-conductive fiber 85 is conducted in or through the optical waveguide 83 and output into the environment of the vehicle door. The optical waveguide 83 can be connected to the main frame 81 for example with the hot melt method.

Figure 9:
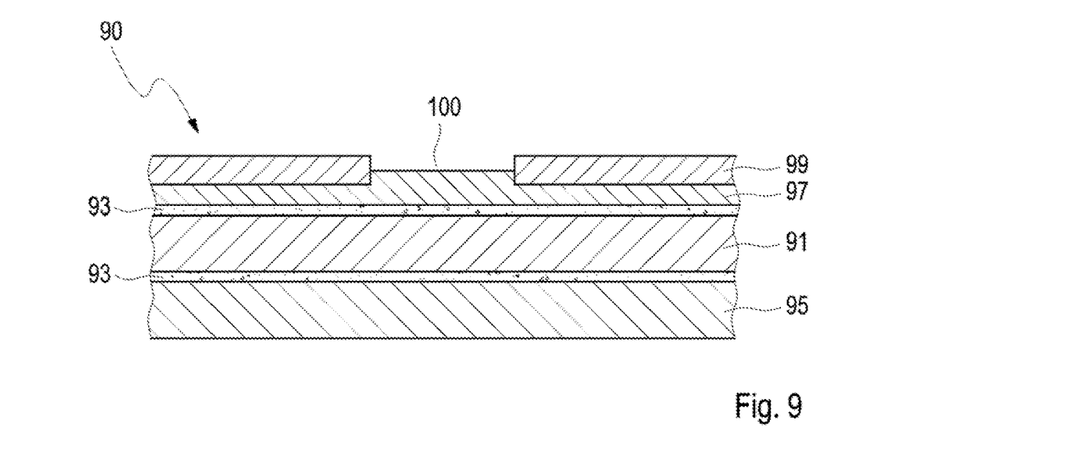
FIG. 9 shows a cross-section through yet another possible embodiment of the present lighting system.

FIG. 9 shows a cross-section of a lighting system 90. An optical waveguide was bonded by means of an adhesive layer 93 both to a base structure 95 of a seat and to a decorative rear part which is equipped with a diffuser 97 and which is made of polyurethane foam. The diffuser 97 is translucent and it can be also colored in order to emit colored light. The diffuser 97 is in its turn applied at the rear part onto a decorative layer 99, which is provided with an opening 100, through which the light is emitted from the diffuser 97 into the environment. The decorative layer 99 itself can be translucent or opaque, and it can in particular have a thickness of 0.5 to 0.7 mm.

By applying the diffuser 97 onto the decorative layer 99, the polyurethane forming the diffuser 97 can penetrated deeply into the opening 100 of the decorative layer 99 and the opening 100 is thus at least partially sealed or filled, so that a potential contamination which may occur can be prevented before it penetrates into the opening 100.

The invention claimed is:

1. A lighting system for an interior module of a motor vehicle, comprising:
    at least one illumination source, at least one optical waveguide and at least one radiating element, wherein the at least one optical waveguide is arranged on a main frame of an interior module and the light generated by the at least one illumination source is supplied to the radiating element which is optically connected to the optical waveguide,
    wherein the optical waveguide is glued to the main frame and the optical waveguide is manufactured at least partially from silicon, and wherein the optical waveguide is engaged in a form-fitting manner at least in one opening of a decorative layer, and the optical waveguide forms with the decorative layer a smooth surface, which is substantially sealed against contamination, and
    wherein the illumination source is directly exposed to both a vehicle interior and the optical waveguide and wherein the illumination source emits light directly into the vehicle interior and into the optical waveguide.

2. The lighting system according to claim 1, wherein the optical waveguide and the radiating element are combined into one element.

3. The lighting system according to claim 1, wherein the optical waveguide further comprises light-conducting fibers.

4. The lighting system according to claim 1, wherein the at least one illumination source is at least partially inserted into a seam of a vehicle door in a substance delimiting the vehicle door in the outward direction.

5. The lighting system according to claim 1, wherein the interior module is selected from: a vehicle door, a vehicle seat, a sunroof and a cladding.

6. A method for manufacturing a lighting system for an interior module of a vehicle, comprising:
    at least one optical waveguide is connected to a main frame of interior module, wherein the optical waveguide is further connected to a radiating element, so that the light conducted from an illumination source into the optical waveguide is emitted by the radiating element into the environment of the interior module, wherein the at least one optical waveguide is applied onto the main frame of the interior module substantially as a liquid and connected to a decorative layer, and wherein the at least one optical waveguide is connected in a first step by an adhesive to the main frame of the interior module, wherein the adhesive is activated in a second step, the illumination source is affixed to the main frame, wherein the illumination source is directly exposed to both a vehicle interior and the optical waveguide.

* * * * *